Patented Apr. 23, 1940

2,198,582

UNITED STATES PATENT OFFICE 2,198,582

ETHER ESTERS OF PARA HYDROXY BENZOIC ACID

Ernest F. Grether and Russell B. Du Vall, Midland, Mich., assignors to The Dow Chemical Company, Midland, Mich., a corporation of Michigan No Drawing. Application October 1, 1937, Serial No. 166,746

6 Claims. (Cl. 260—473)

This invention concerns new ether esters of parahydroxy benzoic acid, having the general formula:

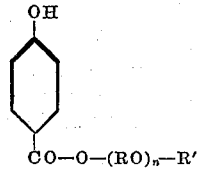

wherein R represents an alkylene radical containing at least 2 carbon atoms, $n$ is an integer, and R' represents alkyl or aryl.

The new compounds herein disclosed are useful as plasticizers in nitrocellulose, cellulose acetate, and cellulose ether, e. g. ethyl cellulose, compositions. They are compatible with such cellulose derivatives, substantially non-volatile at room temperatures, soluble or miscible in the usual solvents or solvent mixtures for dissolving cellulose derivatives, and do not readily decompose or become discolored. Cellulose derivative compositions plasticized with the aforesaid new compounds are suitable for use in the preparation of artificial leather, lacquers, Celluloid, films, and molded plastics, as well as for the other uses to which cellulose derivative compositions are ordinarily put.

The ether esters of parahydroxy benzoic acid may be prepared by esterifying parahydroxy benzoic acid with a mono-ether of a glycol, e. g., an alkyl or aryl mono-ether of ethylene glycol, diethylene glycol, dipropylene glycol, triethylene glycol, tetraethylene glycol, etc. We usually carry out the esterification by heating a mixture of parahydroxy benzoic acid and, preferably, more than its molecular equivalent of a mono-ether of a glycol, together with a small proportion, e. g., 0.02 to 0.06 molecular equivalent of a strong acid, such as sulphuric or benzene sulphonic acid, to a temperature above 100° C., preferably between 120° and 150° C. Water distills from the mixture as it is formed. If desired, a water-immiscible organic solvent, such as benzene or toluene, may be added for the purpose of promoting the vaporization of water from the reaction mixture. The esterification is usually completed after from 3 to 10 hours heating, although longer heating may sometimes be required. The reacted mixture is treated with sufficient alkali to neutralize the acid contained therein, after which the ester product is separated by fractional distillation under vacuum.

The following examples illustrate a number of ways in which the principle of our invention may be employed, but are not to be construed as limiting the same:

Example 1

A mixture of 200 grams (1.45 mols) of parahydroxy benzoic acid, 160 grams (1.78 mols) of ethylene glycol mono-ethyl ether, and 2 grams of benzene sulphonic acid was heated at 130° C. for 4 hours in a flask fitted with a dropping funnel, condenser, and receiver arranged in such manner as to permit distillation of water from the mixture. During the heating benzene was added drop-wise to facilitate the distillation of water. The reacted mixture was dissolved in benzene and washed 3 times with dilute aqueous sodium carbonate. Benzene was removed by distillation and the ester product distilled under vacuum. There was obtained the beta-ethoxy-ethyl ester of parahydroxy benzoic acid, a colorless liquid distilling at 203° C. under 3 millimeters pressure, and having a specific gravity of 1.145 at 20/4° C. and a refractive index, $$n_D^{20} = 1.530$$

Example 2

A mixture of 207 grams (1.5 mols) of parahydroxy benzoic acid, 152 grams (2.0 mols) of ethylene glycol mono-methyl ether, and 6 grams of benzene sulphonic acid was heated at 100°–110° C. for 8.5 hours. During the heating benzene was added drop-wise to facilitate the distillation of water from the mixture. The reacted mixture was dissolved in benzene and washed with a dilute aqueous sodium carbonate solution. Benzene was removed by distillation under vacuum, after which the ester product was fractionally distilled. There was obtained the beta-methoxy-ethyl ester of parahydroxy benzoic acid, a white crystalline solid which distills at 173°–178° C. under 1 millimeter pressure and after recrystallization from ethyl alcohol has a melting point of 90°–91° C.

Example 3

A mixture of 100 grams (0.725 mol) of parahydroxy benzoic acid, 100 grams (0.93 mol) of ethylene glycol mono-butyl ether was heated at 125°–145° C. for 5 hours as in Example 1. The reacted mixture was fractionally distilled under vacuum. There was obtained the beta-butoxy-ethyl ester of parahydroxy benzoic acid, a thick liquid distilling at 194°–201° C. under 2 millimeters pressure, having a specific gravity of 1.110 at 20/20° C., and an index of refraction, $$n_D^{20} = 1.5240$$

Example 4

A mixture of 82.6 grams (0.6 mol) of parahydroxy benzoic acid, 100 grams (0.72 mol) of ethylene glycol mono-phenyl ether and 2 grams of benzene sulphonic acid was heated at 150°–160° C. for 4 hours as in Example 1. The reacted mixture was dissolved in benzene, washed, and the product recovered as in Example 1. There was obtained the beta-phenoxy-ethyl ester of parahydroxy benzoic acid, a white-crystalline solid melting at 118°–119° C.

Example 5

A mixture of 200 grams (1.45 mols) of parahydroxy benzoic acid, 250 grams (1.86 mols) of diethylene glycol mono-ethyl ether, and 2 grams of benzene sulphonic acid was heated at 145°–155° C. for 4 hours as in Example 1. The reacted mixture was dissolved in benzene, washed and the product recovered as in Example 1. There was obtained the beta-ethoxy-ethoxy-ethyl ester of parahydroxy benzoic acid, a viscous, pale yellow liquid, having a specific gravity of 1.161 at 30/4° C. and an index of refraction, $$n_D^{30} = 1.5260$$

Other ether esters of parahydroxy benzoic acid may be prepared by reacting parahydroxy benzoic acid with glycol mono-ethers in accordance with the procedure hereinbefore described. For example, parahydroxy benzoic acid may be reacted with ethylene glycol mono-o-chlorphenyl-ether to produce the beta-o-chlorphenoxy-ethyl ester of parahydroxy benzoic acid; with diethylene glycol mono-isobutyl ether to produce the beta-isobutoxy-ethoxy-ethyl ester of parahydroxy benzoic acid; with propylene glycol mono-isopropyl ether to produce the gamma-isopropoxy-propyl ester of parahydroxy benzoic acid; with diethylene glycol mono-phenyl ether to produce the beta-phenoxy-ethoxy-ethyl ester of parahydroxy benzoic acid, etc. Insofar as we are aware, parahydroxy benzoic acid can be esterified with any glycol ether containing at least one hydroxyl group to form the corresponding ester product.

Other modes of applying the principle of our invention may be employed instead of those explained, change being made as regards the materials employed, provided the products stated by any of the following claims or the equivalent of such stated products be obtained.

We therefore particularly point out and distinctly claim as our invention:

1. An ether ester of parahydroxy benzoic acid having the general formula:

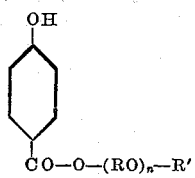

wherein R represents an alkylene radical containing at least 2 carbon atoms, n is an integer, and R' represents a radical selected from the group consisting of alkyl and aryl radicals.

2. An ether ester of parahydroxy benzoic acid having the general formula:

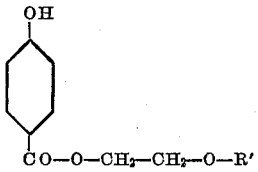

wherein R' represents a radical selected from the group consisting of alkyl and aryl radicals.

3. An ether ester of parahydroxy benzoic acid having the general formula:

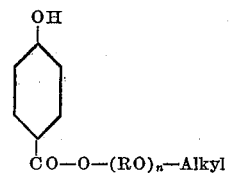

wherein R represents an alkylene radical containing at least 2 carbon atoms and n is an integer not greater than 2.

4. The beta-ethoxy-ethyl ester of parahydroxy benzoic acid, a colorless liquid distilling at approximately 203° C. under 3 millimeters pressure, and having a specific gravity of about 1.145 at 20/4° C., an index of refraction $$n_D^{20} = 1.530$$

and the formula:

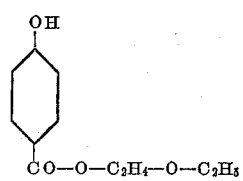

5. The beta-ethoxy-ethoxy-ethyl ester of parahydroxy benzoic acid, a viscous liquid distilling with decomposition at approximately 220°–240° C. under 2 millimeters pressure, and having a specific gravity of 1.161 at 30/4° C., an index of refraction, $$n_D^{30} = 1.5260$$

and the formula:

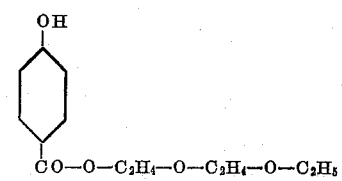

6. The beta-phenoxy-ethyl ester of parahydroxy benzoic acid, a white crystalline solid having a melting point of approximately 118°–119° C., and the formula:

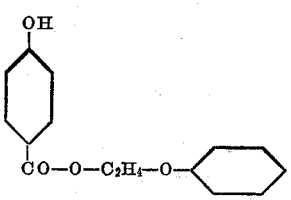

ERNEST F. GRETHER.
RUSSELL B. DU VALL.